Figure 1:
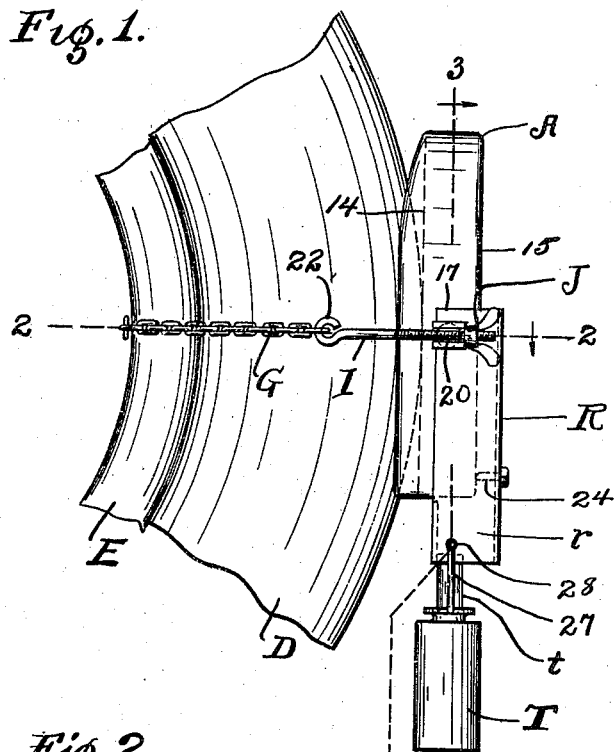

V. H. MEYER.
VULCANIZER FOR REPAIRING RUBBER TIRES, &c.
APPLICATION FILED AUG. 16, 1909.

949,154.

Patented Feb. 15, 1910.
2 SHEETS—SHEET 1.

Witnesses:
H. J. Gittins.
B. C. Brown.

Inventor:
Vernon H. Meyer
By
his Attorneys.

V. H. MEYER.
VULCANIZER FOR REPAIRING RUBBER TIRES, &c.
APPLICATION FILED AUG. 16, 1909.
949,154.
Patented Feb. 15, 1910.
2 SHEETS—SHEET 2.
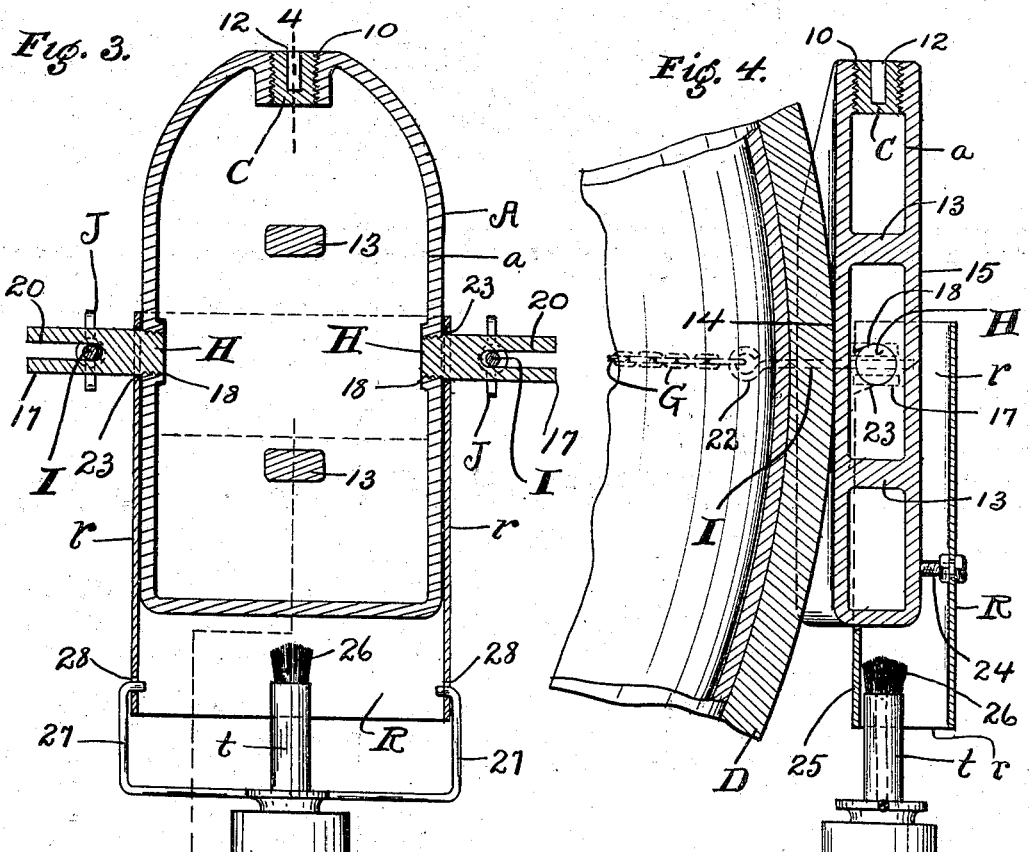
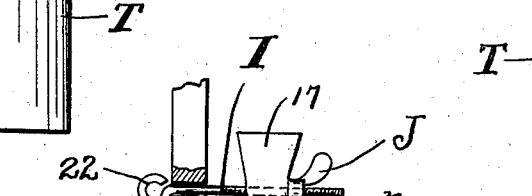
Witnesses:
H. J. Gettins.
B. C. Brown.
Inventor:
Vernon H. Meyer
By
his Attorneys.

UNITED STATES PATENT OFFICE.

VERNON H. MEYER, OF CLEVELAND, OHIO.

VULCANIZER FOR REPAIRING RUBBER TIRES, &c.

949,154.

Specification of Letters Patent. Patented Feb. 15, 1910.

Application filed August 16, 1909. Serial No. 512,993.

*To all whom it may concern:*

Be it known that I, VERNON H. MEYER, a citizen of the United States of America, residing at Cleveland, in the county of Cuyahoga and State of Ohio, have invented certain new and useful Improvements in Vulcanizers for Repairing Rubber Tires, &c.; and I hereby declare the following to be a full, clear, and exact description of the invention, such as will enable others skilled in the art to which it pertains to make and use the same.

This invention relates to improvements in portable vulcanizers suitable for use in repairing rubber tires, etc.

This invention pertains more especially to a vulcanizer which comprises a hollow metal body having an interior closed chamber adapted to receive and hold water and provided externally with a laterally facing vulcanizing surface arranged to be placed against the tire-casing, tube or other object of rubber to be repaired.

Another object is to inexpensively form an upright flue into which pass the products of combustion arising from the burner of a torch or heating device employed in heating the body of the vulcanizer, and to have the said flue and the operating vulcanizing surface of the said body arranged at opposite sides respectively of the body.

Another object is to provide the said body with two vulcanizing surfaces arranged at opposite sides respectively of the body, and to employ a plate instrumental in the formation of the aforesaid flue at the one or the other of the said sides and to render the said plate removable from the body to permit of the formation of the said flue at the one or the other of the said sides so that when one of the vulcanizing surfaces is operating on the rubber tire-casing, tube or other object requiring repairs the other vulcanizing surface participates in the formation of the said flue.

Another object is to removably attach the torch or heating device to suitably spaced flanges formed on and projecting inwardly from the said plate, and to provide the latter with a guard formed by a web connecting the said flanges together and arranged to prevent a flame or products of combustion arising from the torch or heating device from coming in contact with the object being repaired.

Another object is to provide a vulcanizer which is simple and durable in construction, easily operated and efficient in its operation, and not liable to get out of order.

With these objects in view, and to the end of realizing any other advantages hereinafter appearing, this invention consists in certain features of construction, and combinations of parts, hereinafter described, pointed out in the claims, and illustrated in the accompanying drawings.

Figure 2:
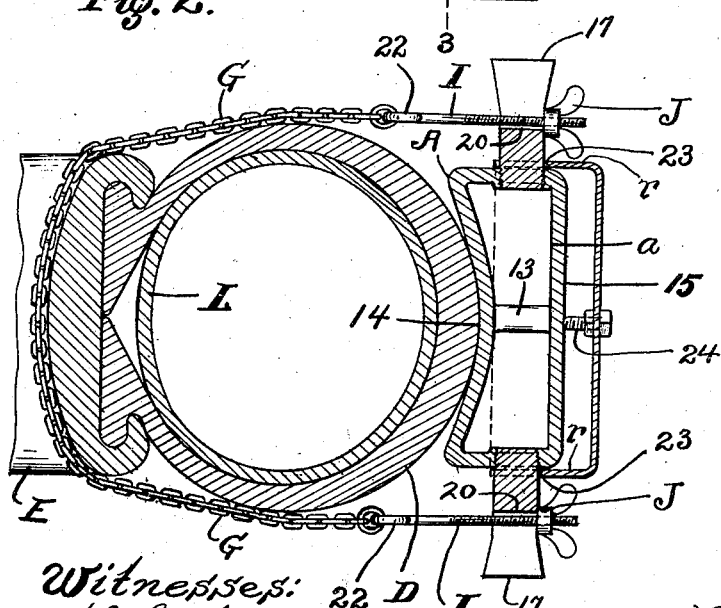

In the said drawings, Figure 1 is an elevation of a vulcanizer embodying my invention, and shows the vulcanizer applied to the rubber casing of a pneumatic tire. Fig. 2 is a horizontal section on line 2—2, Fig. 1, looking downwardly. Fig. 3 is a section taken along line 3—3, Fig. 1, looking in the direction indicated by the arrow, and shows the torch or heating device of the vulcanizer in elevation. Fig. 4 is a vertical section taken along line 4—4, Fig. 3, looking in the direction indicated by the arrow. Fig. 5 is a top plan, partly in section, of the vulcanizer, and shows the latter attached to a board between which and the body of the vulcanizer is interposed a rubber tube to be repaired.

Referring to the drawings, A indicates the hollow metal body of my improved vulcanizer. The body A consists preferably of a single casting and is provided interiorly with a chamber $a$ for receiving water (not shown). The body A is preferably used as a steam-generator and is heated as will hereinafter appear. It will be observed therefore that my improved vulcanizer comprises a closed water-receiving chamber $a$. The chamber $a$ is shown provided in the top wall thereof with a screw-threaded aperture 10 closed by a correspondingly externally screw-threaded plug C which is provided in its outer end with a cavity 12 extending downwardly from the top surface of the plug and adapted to receive a thermometer (not shown) used to disclose the temperature to which the body A is heated during the operation of the vulcanizer. The chamber $a$ may be supplied with water at the aperture 10 upon removing the plug C, and I would here remark that the said chamber is filled about one-third full of water preparatory to the first operation of the vulcanizer and does not require refilling. It will be observed therefore that the plug C forms not only a stopper for closing the aperture 10, but a socket or holder for a thermometer.

The body A is provided with two vulcanizing surfaces 14 and 15 arranged at opposite sides respectively of the body and extending from the upper end to the lower end of the body. The vulcanizing surface 14 curves inwardly and transversely of the body A to render the said surface capable of conforming to and partially embracing the casing of a pneumatic tire. The vulcanizing surface 15 is flat and designed more especially for use in vulcanizing a rubber tube, such, for instance, as the inner tube of a pneumatic tire. It will be observed therefore that the vulcanizing surfaces 14 and 15 are formed by the outer surface of opposite side walls respectively of the chamber $a$, and the body A is provided internally with two webs 13 and 13 spaced vertically between the top and bottom of the said chamber, which webs extend between and are integral with and reinforce the said walls.

Figs. 1, 2 and 4 show my improved vulcanizer in position with the curved vulcanizing surface 14 in contact with the casing D of a pneumatic tire on a vehicle-rim E, and the means employed in attaching the vulcanizer to the tire and wheel-rim preferably comprise a chain-strap G which extends across the inner circumferentially extending surface of the wheel-rim and has opposite end-portions thereof overlapping opposite sides respectively of the tire and attached to the body A which is preferably provided between the two vulcanizing surfaces 14 and 15 with two oppositely arranged outwardly projecting substantially horizontal arms 17 and 17 which are in line endwise, as shown very clearly in Fig. 3. Preferably the body A is provided between its two vulcanizing surfaces 14 and 15 with two oppositely arranged substantially horizontal screw-threaded holes 18 and 18 which are in line endwise and formed at opposite sides respectively of the said vulcanizing surfaces. Each hole 18 extends from the chamber $a$ to the exterior of the body A, and a correspondingly externally screw-threaded plug H is screwed into and removable from the said hole and projects far enough beyond the exterior of the body A to have its outer portion form an arm 17 of the body. The arms 17 and 17 are therefore removably attached to the body A. The chamber $a$ may be supplied with water at the one or the other of the holes 18 upon removing the plug H which occupies the said hole. Each arm 17 is provided centrally between the top and bottom of the arm with a slot 20 which extends laterally through the arm and from the outer extremity of the arm inwardly a suitable distance, and an eye-bolt I extends substantially horizontally through the said slot and is arranged substantially at a right angle to the arm. When the vulcanizer is to be used in vulcanizing a tire-casing D, as shown in Figs. 1, 2 and 4, the eye-bolts I and I are arranged with their eye-shaped heads 22 adjacent the tire and attached to opposite ends respectively of the chain-strap G, and the shanks of the eye-bolts extend from the chain-strap-facing sides of the arms 17 through the slots 20 in the said arms and beyond the opposite sides of the arms, and thumb-nuts J are mounted on the said shanks and tightened against the last-mentioned sides of the said arms to draw the chain-strap tightly against the inner circumferential surface of the wheel-rim and to hold the body A at its vulcanizing surface 14 in contact with the tire-casing.

In Fig. 5 the vulcanizer is shown attached to a board K, and a rubber tube L to be repaired is shown interposed between the said board and the flat vulcanizing surface 15 of the body A, and the said body and the said board are clamped together between the eye 22 of each eye-bolt I and the nut J on the bolt.

By the construction hereinbefore described it will be observed that one of the upright laterally facing vulcanizing sides or surfaces of the body A engages the object to be vulcanized during the operation of the vulcanizer, and I would here remark that a metal plate R is arranged opposite and spaced a suitable distance from the other vulcanizing side or surface of the said body, which plate extends from a suitable distance below the said body upwardly to and a suitable distance above the arms 17 and is provided at its inner side with two laterally and inwardly projecting flanges $r$ and $r$ which extend from the upper end to the lower end of the plate and have lateral slots 23 through which the arms 17 extend, which slots have their top walls overlapping and resting on the top surfaces of the said arms. The slots 23 extend laterally through the flanges $r$ and to the upright edges of the said flanges so that the plate R is removably supported from the arms 17 and consequently from the body A. The plate R is provided opposite the adjacent vulcanizing surface of the body A with a set-screw or inwardly projecting member 24 which is arranged to engage the said surface in the vertical position of the plate and is therefore instrumental in steadying the said plate. The two flanges $r$ of the plate R are connected together under the body A by an imperforate web 25 which extends between the said flanges at the upright edges of the flanges and into suitable proximity to the bottom of the said body. The plate R and its flanges $r$ and the web 25 form a vertically arranged or upright flue below the body A, and the upward extension of the said plate opposite the adjacent vulcanizing surface coöperates with the said surface in forming an upward extension of the said flue next to the body.

Means for heating the body A are provided below the latter and preferably comprise a torch T having its burner t arranged under the said body, which burner projects upwardly into the lower portion of the flue at and in close proximity to the inner side of the web 25 and has such arrangement relative to the said body that a flame (not shown) arising from the wick 26 of the burner during the operation of the torch shall impinge against the bottom of the said body. The torch T is removably connected with the body A, preferably having two spring-arms 27 and 27 arranged at opposite sides respectively of the torch and engaging and removable from a hole 28 formed in opposite flanges r and r respectively of the plate R.

By the construction hereinbefore described it will be observed that the web 25 forms a guard to prevent the flame arising from the torch from coming directly in contact with the object to be repaired, that the products of combustion arising from the said flame pass upwardly along the body A, and that the plate R can be readily moved from opposite the flat vulcanizing surface to and opposite the curved vulcanizing surface or vice versa. It will be observed also that the torch, being removably attached to the flanges r of the plate R, is removable with the said plate from the body A.

What I claim is:—

1. In a vulcanizer for repairing rubber tires, etc., an interiorly chambered metal body having two external vulcanizing surfaces formed at opposite sides respectively of the body, an upright flue formed at one of the said sides of and extending under the body, said flue being removable from the one to the other of the said sides, and a heating device projecting into the lower portion of the flue and arranged to heat the body.

2. In a vulcanizer for repairing rubber tires, etc., an interiorly chambered metal body having an external vulcanizing surface formed at one side of the body; an upright plate arranged opposite and spaced from the opposite side of the body, which plate extends below the body and is provided at its inner side with two laterally and inwardly projecting flanges which extend up and down the plate and are connected together by a web under the body a suitable distance from the last-mentioned side of the body, said plate and its flanges and the said web and the last-mentioned side of the body forming a flue, and means for heating the body at the inner side of the said web.

3. In a vulcanizer for repairing rubber tires, etc., an interiorly chambered metal body having an external vulcanizing surface formed at one side of the body; an upright plate arranged opposite and spaced from the opposite side of and extending below the body, which plate is supported from the body and provided at its inner side with two laterally and inwardly projecting flanges which extend up and down the plate and are connected together by a web under the body, said plate and the body coöperating in forming an upright flue, and a heating device projecting into the lower portion of the said flue and arranged to heat the body.

4. In a vulcanizer for repairing rubber tires, etc., an interiorly chambered metal body having two external vulcanizing surfaces formed at opposite sides respectively of the body; an upright plate arranged opposite and spaced from one of the said sides and extending below the body, which plate is removably attached to the body and provided at its inner side with two laterally and inwardly projecting flanges which extend up and down the plate and are connected together by a web under the body, and means for heating the bottom of the body at the inner side of the said web.

5. In a vulcanizer for repairing rubber tires, etc., an interiorly chambered metal body having two external vulcanizing surfaces formed at opposite sides respectively of the body, one of the said surfaces being flat and the other curved inwardly and transversely; an upright plate arranged opposite and spaced from one of the said sides of and extending below the body, which plate is removably attached to the body and provided at its inner side with two laterally and inwardly projecting flanges which extend up and down the plate and are connected together under the body by an imperforate web which extends into suitable proximity to the body, and means for heating the bottom of the body at the inner side of the web.

6. In a vulcanizer for repairing rubber tires, etc., an interiorly chambered metal body having an external vulcanizing surface formed at one side of the body; a plate arranged opposite and spaced from the opposite side of and extending below the body and provided at its inner side with two laterally and inwardly projecting flanges which extend up and down the plate, and a torch removably attached to the said flanges and having its burner arranged to heat the bottom of the body during the operation of the torch.

7. In a vulcanizer for repairing rubber tires, etc., an interiorly chambered metal body having an external vulcanizing surface formed at one side of the body; a plate arranged opposite and spaced from the opposite side of the body and provided at its inner side with two laterally and inwardly projecting flanges which extend up and down the plate, which flanges have lateral holes, and a torch having its burner arranged to heat the bottom of the body, said torch being provided with spring-arms projecting into and removable from the aforesaid holes.

8. In a vulcanizer for repairing rubber tires, etc., an interiorly chambered metal body having two external vulcanizing surfaces formed at opposite sides respectively of the body, said body being provided between its said sides with two oppositely arranged substantially horizontal arms which are in line endwise; a plate arranged opposite and spaced from one of the aforesaid sides of the body and provided at its inner side with two laterally and inwardly projecting flanges extending up and down the plate, which flanges are provided with slots whose top walls overlap the top surfaces of and rest on the aforesaid arms, and a heating device arranged to heat the bottom of the body.

In testimony whereof, I sign the foregoing specification, in the presence of two witnesses.

VERNON H. MEYER.

Witnesses:
C. H. DORER,
B. C. BROWN.